(12) United States Patent
Roffe et al.

(10) Patent No.: US 11,396,909 B2
(45) Date of Patent: Jul. 26, 2022

(54) EXPANDABLE STACKED THRUST BEARING ASSEMBLY

(71) Applicant: Schaeffler Technologies AG & Co. KG, Herzogenaurach (DE)

(72) Inventors: Dennis Roffe, Fort Mill, SC (US); James Brown, Rock Hill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/101,093

(22) Filed: Nov. 23, 2020

(65) Prior Publication Data

US 2022/0163062 A1    May 26, 2022

(51) Int. Cl.
*F16C 27/08*    (2006.01)
*F16C 19/30*    (2006.01)

(52) U.S. Cl.
CPC ............ *F16C 27/08* (2013.01); *F16C 19/305* (2013.01)

(58) Field of Classification Search
CPC .......... F16C 19/10; F16C 19/12; F16C 19/30; F16C 19/305; F16C 19/32; F16C 19/48; F16C 19/52; F16C 19/522; F16C 19/527; F16C 27/06; F16C 27/066; F16C 27/08
See application file for complete search history.

(56) References Cited

U.S. PATENT DOCUMENTS

| 9,933,010 B2 | 4/2018 | Brown et al. |
| 10,683,891 B1 * | 6/2020 | Roffe .................. F16C 19/55 |
| 2016/0230809 A1 | 8/2016 | Roffe et al. |

FOREIGN PATENT DOCUMENTS

| DE | 102010035784 | * | 3/2012 |
| DE | 102010035784 A1 | | 3/2012 |
| JP | 2015-21576 | * | 2/2015 |

* cited by examiner

*Primary Examiner* — James Pilkington

(57) ABSTRACT

A double row axial roller bearing assembly includes a compressible ring between the two rows. This compressible ring prevents excessive axial forces if the respective shafts impact one another after becoming axially separated. One embodiment is fully unitized such that all parts of the bearing assembly remain with one of the two shafts if the shafts become axially separated. Another embodiment is semi-unitized such that one row of rollers and the compressible ring remain with one of the shafts while the other row of rollers remains with the other shaft. In both cases, all bearing components are prevented from falling out of position such that they return to their proper axial and radial position when the shafts come back together.

13 Claims, 3 Drawing Sheets

EXPANDABLE STACKED THRUST BEARING ASSEMBLY

TECHNICAL FIELD

The disclosure pertains to the field of roller bearings. More particularly, the disclosure pertains to the field of dual row, unitized axial roller bearings.

BACKGROUND

Rotational bearings are used to separate parts that have relative rotation. Roller bearings utilize a set of rollers in predominantly rolling contact with hardened races. The bearing permits transmission of large forces between components with relative rotation. In an axial bearing, the force is parallel to the axis of rotation. Due to the rolling contact, resistance to relative rotation is minimal. For axial roller bearings, the races are commonly formed in washers which are considered part of the bearing assembly. Each washer contacts one of the components, either a housing or a shaft, and does not rotate with respect to that component. Many bearing assemblies utilize a cage to circumferentially position the rollers with respect to one another.

Some bearing assemblies rely on mating parts, such as the housings or shafts being separated, to retain the components of the bearing with respect to one another. Such bearing assemblies may require an assembly fixture to keep the bearing assembly together prior to and during installation. If the parts separate during operation, there is a risk of parts of the bearing assembly from falling out of position. A unitized bearing assembly, on the other hand, is designed to stay together when not installed without reliance on assembly fixtures or special handling. In operation, a unitized bearing does not depend on surrounding parts to retain its components.

SUMMARY

An axial bearing includes a compressible ring, first and second inner washers, first and second outer washers, and first and second rows of rollers. The first and second inner washers are on opposite axial sides of the compressible ring. The first row of rollers axially separates the first inner washer from the first outer washer. Similarly, the second row of rollers axially separates the second inner washer from the second outer washer. The first outer washer is retained to the compressible ring. The compressible ring may be, for example, a rubber washer. Alternatively, the compressible ring may be a spring such as a garter spring. First and second cages may be configured to circumferentially position rollers of the first and second rows of rollers, respectively. A retaining element may be configured to retain the first cage and the second cage with the first outer washer retained by the first cage and the compressible ring retained between the first and second inner washers. The second outer washer may be retained by the second cage. The compressible ring may include an axial extension configured to retain the first inner washer. The first inner washer may include a first cylindrical extension configured to retain the first cage. The first outer washer may be retained to the first cage. The second inner washer may include a second cylindrical extension configured to retain the second cage. The second outer washer may be retained to the second cage.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
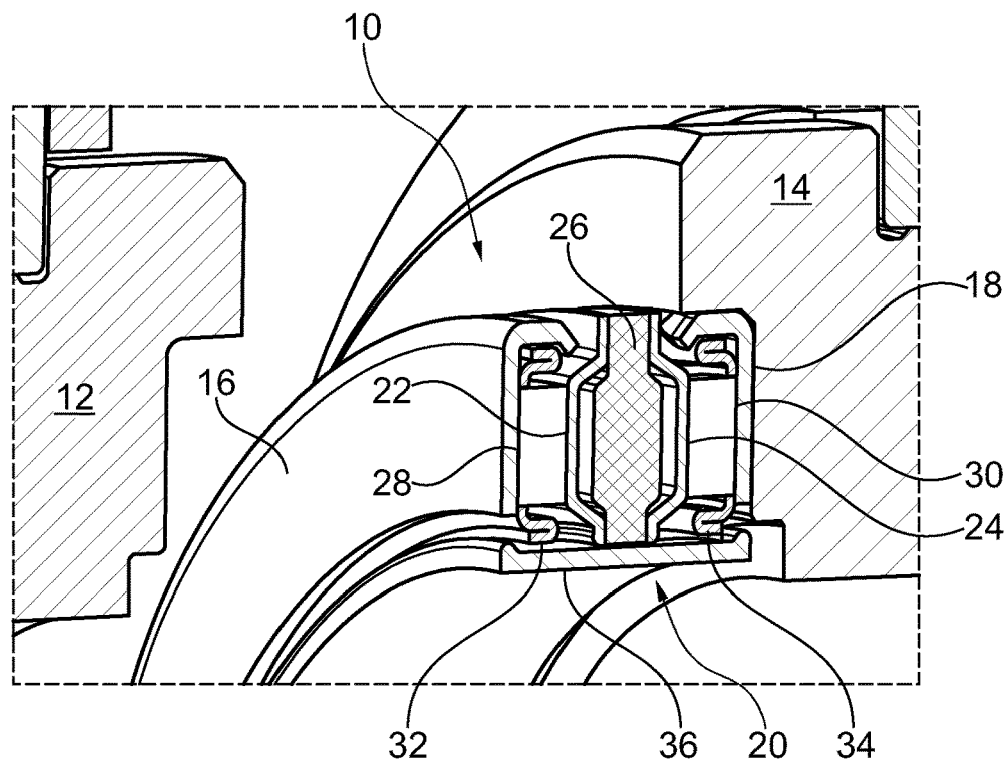
FIG. 1 is a cut-away pictorial view of a fully unitized double row axial bearing with shafts separated.
Figure 2:
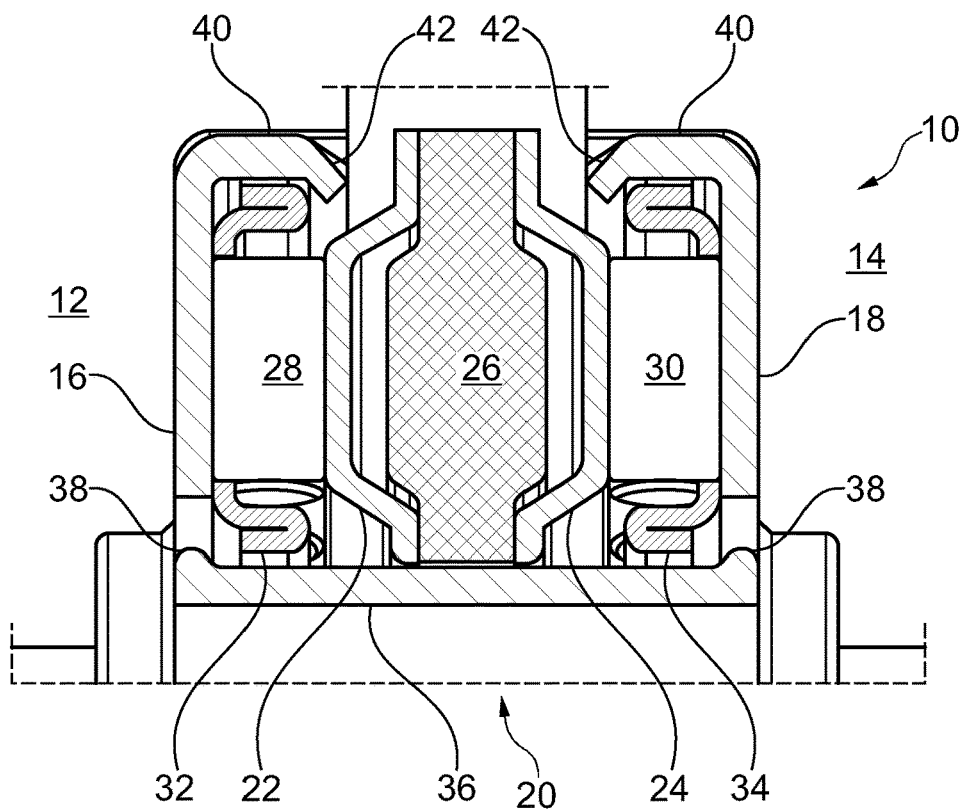
FIG. 2 is a cross-section of the bearing of FIG. 1 with the shafts compressed against one another.

FIGS. 1 and 2 show a first embodiment of a stacked thrust bearing arrangement 10 designed to transmit axial loads between two shafts 12 and 14 while permitting relative rotation between the shafts and also permitting some degree of relative axial movement between the shafts. In some applications, one of the two shafts may be a stationary housing as opposed to a rotatable shaft. In FIG. 1, shaft 12 is shown axially displaced. In FIG. 2, shaft 12 is shown in contact with the bearing assembly 10. The bearing assembly 10 includes a first outer washer 16 that directly contacts shaft 12 and a second outer washer 18 that directly contacts shaft 14. A compressible ring 20 is positioned axially between the first washer 16 and the second washer 18. Two inner washers, 22 and 24 are on opposite axial sides of the compressible ring 20. In the embodiment of FIGS. 1 and 2, compressible ring 20 is a rubber washer 26. The compressible ring is free to rotate at a speed that is not constrained by the rotational speed of either shaft 12 or 14. A first set of rollers 28 axially separates the first outer washer 16 from the first inner washer 22. Specifically, the rollers 28 are in predominantly rolling contact with washers 16 and 22 to permit relative rotation with minimal resistance. Similarly, a second set of rollers 30 axially separates the second outer washer 18 from the second inner washer 24. A first cage 32 positions the rollers 28 circumferentially with respect to each other. Cage 32 rotates at a speed between the speed of washer 16 and the speed of compressible ring 20. Similarly, a second cage 34 positions the rollers 30 circumferentially with respect to each other.

The bearing assembly of FIGS. 1 and 2 is a unitized bearing assembly. Retaining element 36 has lips 38 which extend radially far enough to prevent cages 32 and 34 from coming off axially without substantial force. The parts are flexible enough that the cages and the compressible ring can be pushed on from at least one side during assembly of the bearing assembly. First and second washers include a cylindrical portion 40 that positions the washer radially with respect to shaft 12 or 14. The inner side of the cylindrical portion 40 is bent over at 42 to retain the washer with respect to the cage. Since the washers are retained with respect to the cages and the cages and compressible ring are retained with respect to the retaining element 36, the bearing assembly can be treated as a single unit during assembly of the overall product.

In operation, shafts 12 and 14 can rotate with respect to one another with minimal drag. Compressive axial forces are transmitted from one shaft, through one of the washers and one of the rows of rollers to the compressible ring 20. From the compressible ring, the axial load is transferred through the other set of rollers and the other washer to the other shaft. The load will tend to compressible ring 20. If shafts 12 and 14 briefly move away from one another during operation, the bearing assembly 10 will stay together as a unit. When the shafts come back together, the compressibility of ring 20 ensures that the axial forces due to impact loading are not excessive.

Figure 3:
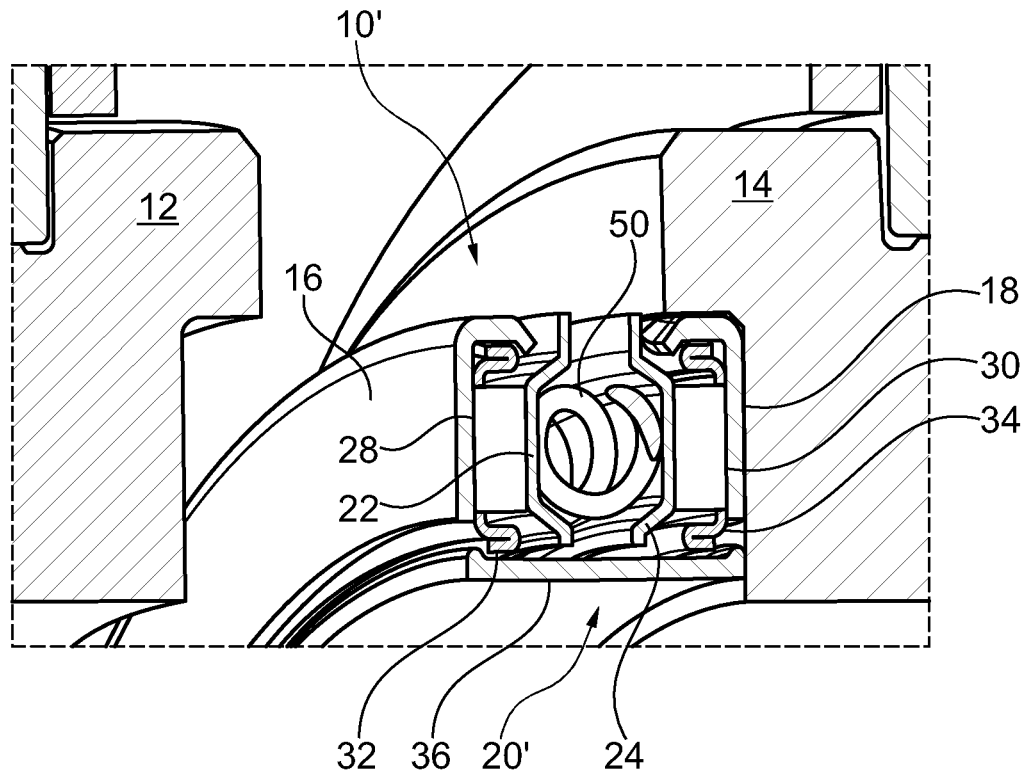
FIG. 3 is a cut-away pictorial view of a variant of the bearing of FIG. 1.

FIG. 3 illustrates a second stacked thrust bearing arrangement 10'. Parts which are the same as the bearing arrangement of FIGS. 1 and 2 are labeled with the same reference number. In the embodiment of FIG. 3, compressible ring 20' takes the form of a garter spring 50. Alternatively, garter spring 50 could be replaced with a wave spring or other type of compression spring. Operation of the embodiment of FIG. 3 is the same as the embodiment of FIGS. 1 and 2.

Figure 4:
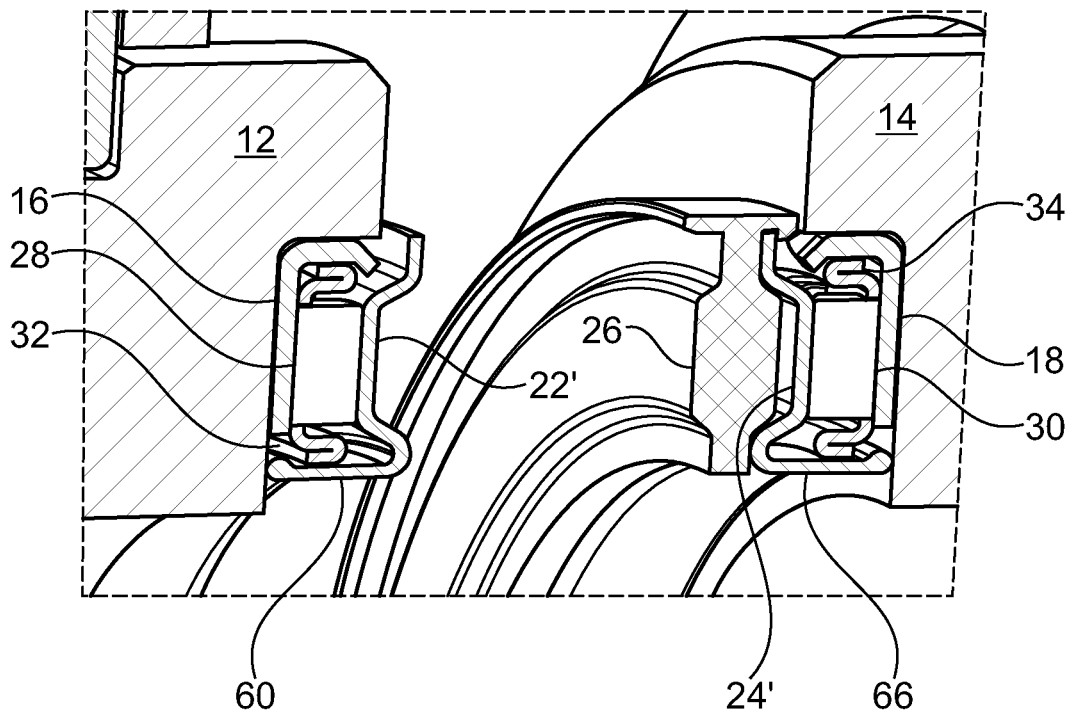
FIG. 4 is a cut-away pictorial view of a partially unitized double row axial bearing with shafts separated.
Figure 5:
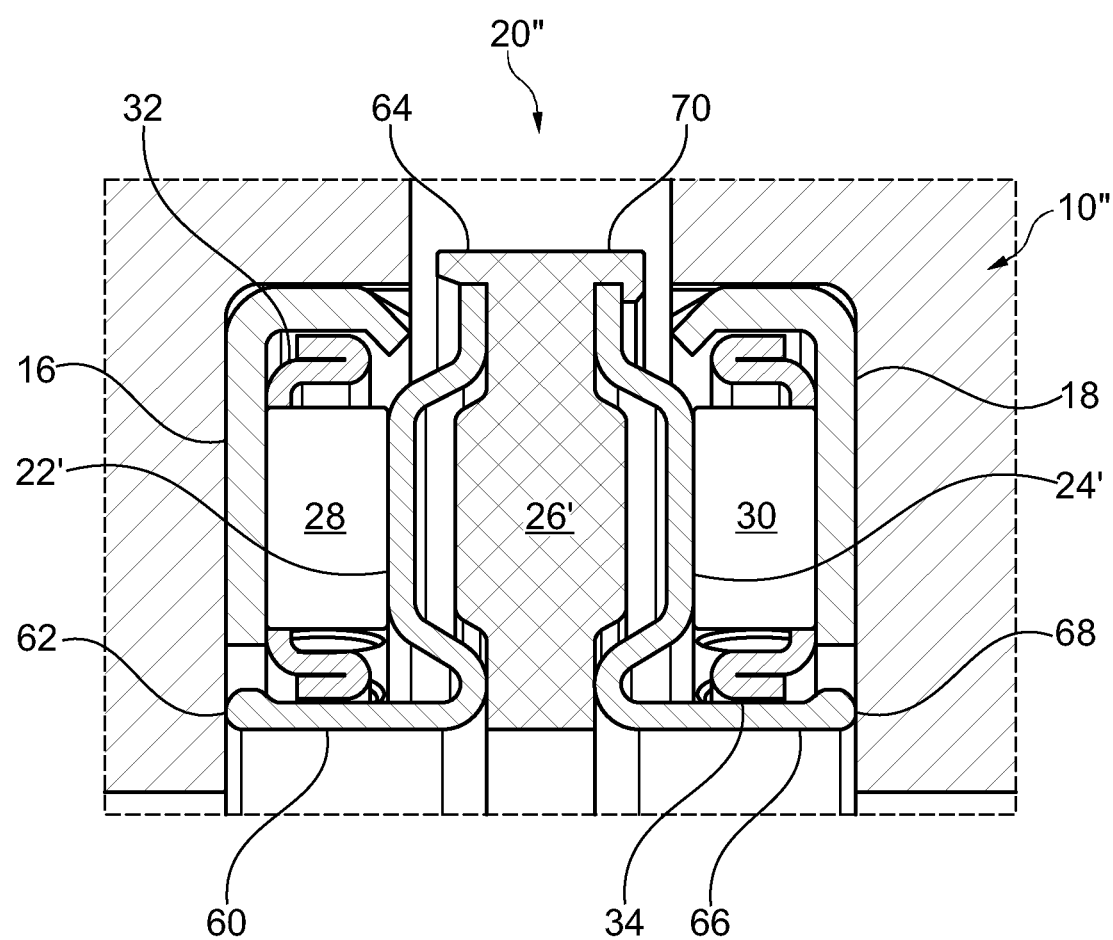
FIG. 5 is a cross-section of the bearing of FIG. 4 with the shafts compressed against one another.

FIGS. 4 and 5 show a third embodiment of a stacked thrust bearing arrangement 10". In FIG. 4, shaft 12 is shown axially displaced. In FIG. 5, shaft 12 is shown in contact with the bearing assembly 10". Parts which are the same as the bearing arrangements of FIGS. 1 through 3 are labeled with the same reference number. Inner washer 22' includes a cylindrical extension 60 with a lip 62 which extends radially far enough to prevent cage 32 from coming off axially without substantial force. The parts are flexible enough that the cages and the compressible ring can be pushed on from at least one side during assembly of the bearing assembly. Compressible ring 20" includes a first axial extension 64 which radially aligns inner washer 22' with the compressible ring but does not retain it axially. Inner washer 24' includes a cylindrical extension 66 with a lip 68 which extends radially far enough to prevent cage 34 from coming off axially without substantial force. Compressible ring 20" includes a second axial extension 70 which radially aligns and retains inner washer 24'.

When shafts 12 and 14 are pressed together, the embodiment of FIGS. 4 and 5 operates the same way as the embodiment of FIGS. 1 and 2. If shafts 12 and 14 briefly move away from one another during operation, as shown in FIG. 4, some portions of bearing assembly 10" stay with shaft 12 and the remainder stays with shaft 14. Specifically, outer washer 16, inner washer 22', cage 32, and rollers 28 stay with shaft 12. When the shafts come back together, first axial extension 64 ensures radially alignment. The compressibility of ring 20" ensures that the axial forces due to impact loading are not excessive.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:

1. An axial bearing comprising:
   a compressible ring;
   a first inner washer and a second inner washer arranged on opposite axial sides of the compressible ring;
   a first outer washer and a second outer washer;
   a first row of rollers axially separating the first inner washer from the first outer washer; and
   a second row of rollers axially separating the second inner washer from the second outer washer, wherein:
   the first outer washer is retained to the compressible ring; and
   the compressible ring is a garter spring.

2. The axial bearing of claim 1 further comprising:
   a first cage configured to circumferentially position rollers of the first row of rollers with respect to one another; and
   a second cage configured to circumferentially position rollers of the second row of rollers with respect to one another.

3. The axial bearing of claim 2 further comprising a retaining element configured to retain the first cage and the second cage and wherein:
   the first outer washer is retained by the first cage; and
   the compressible ring is retained between the first inner washer and the second inner washer.

4. The axial bearing of claim 3 wherein the second outer washer is retained by the second cage.

5. The axial bearing assembly of claim 2 wherein:
   the compressible ring includes an axial extension configured to retain the first inner washer;
   the first inner washer includes a first cylindrical extension configured to retain the first cage; and
   the first outer washer is retained to the first cage.

6. The axial bearing assembly of claim 5 wherein:
   the second inner washer includes a second cylindrical extension configured to retain the second cage; and
   the second outer washer is retained to the second cage.

7. An axial bearing comprising:
   a compressible ring;
   a first inner washer and a second inner washer arranged on opposite axial sides of the compressible ring;
   a first outer washer and a second outer washer;

a first row of rollers axially separating the first inner washer from the first outer washer;
a first cage configured to circumferentially position rollers of the first row of rollers with respect to one another;
a second row of rollers axially separating the second inner washer from the second outer washer;
a second cage configured to circumferentially position rollers of the second row of rollers with respect to one another; and
a retaining element configured to directly retain the first cage to the second cage, wherein the first outer washer is retained by the first cage.

8. The axial bearing of claim 7 wherein the compressible ring is a rubber washer.

9. The axial bearing of claim 7 wherein the compressible ring is a spring.

10. The axial bearing of claim 9 wherein the spring is a garter spring.

11. The axial bearing of claim 7 wherein the second outer washer is retained by the second cage.

12. An axial bearing comprising:
a compressible ring;
a first inner washer and a second inner washer arranged on opposite axial sides of the compressible ring;
a first outer washer and a second outer washer;
a first row of rollers axially separating the first inner washer from the first outer washer;
a first cage configured to circumferentially position rollers of the first row of rollers with respect to one another;
a second row of rollers axially separating the second inner washer from the second outer washer;
a second cage configured to circumferentially position rollers of the second row of rollers with respect to one another; and
a cylindrical extension integrally formed with the first inner washer, wherein:
the compressible ring includes an axial extension configured to retain the first inner washer;
the cylindrical extension is configured to retain the first cage; and
the first outer washer is retained to the first cage.

13. The axial bearing assembly of claim 12 wherein:
the second inner washer includes a second cylindrical extension configured to retain the second cage; and
the second outer washer is retained to the second cage.

\* \* \* \* \*